Figure 5:
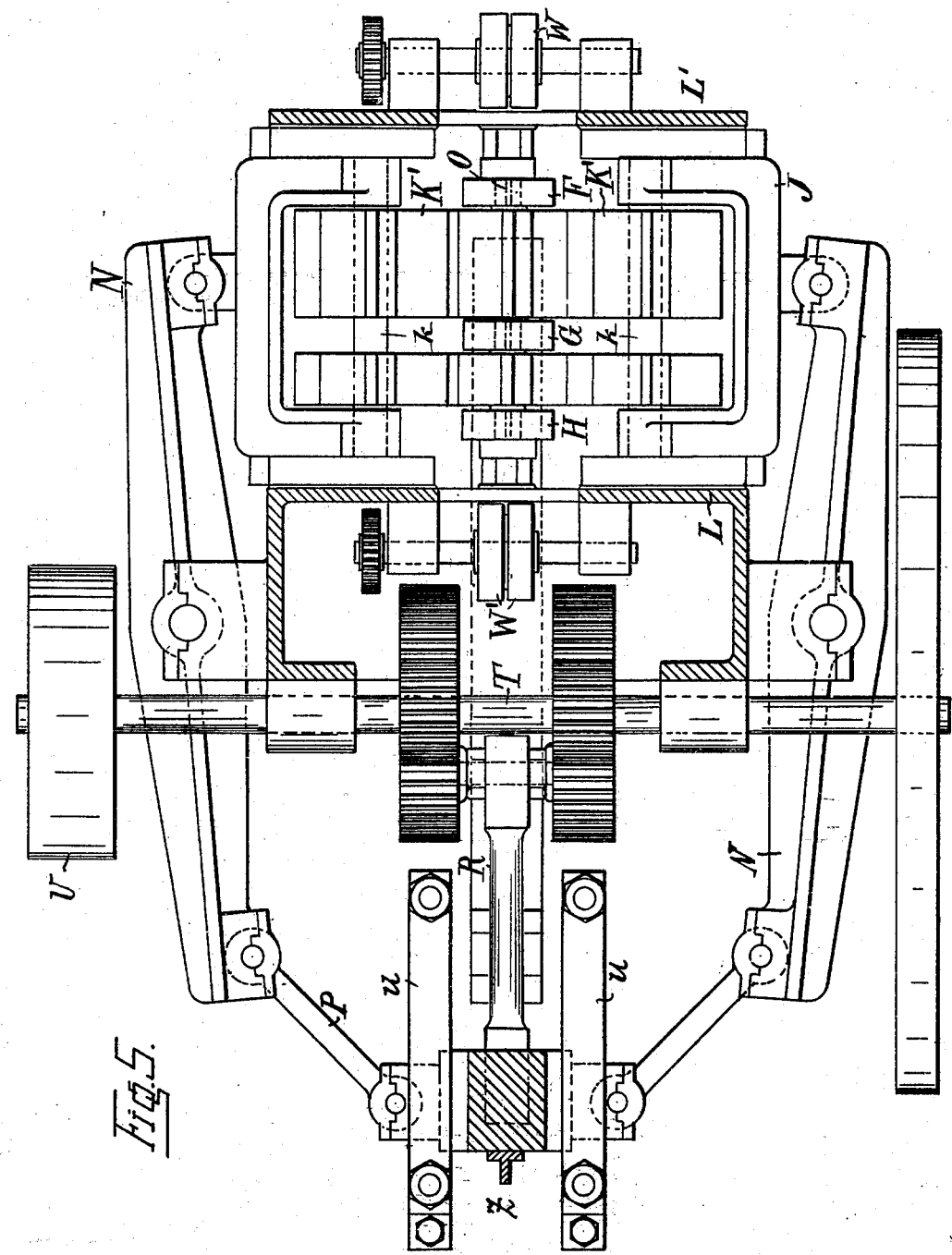

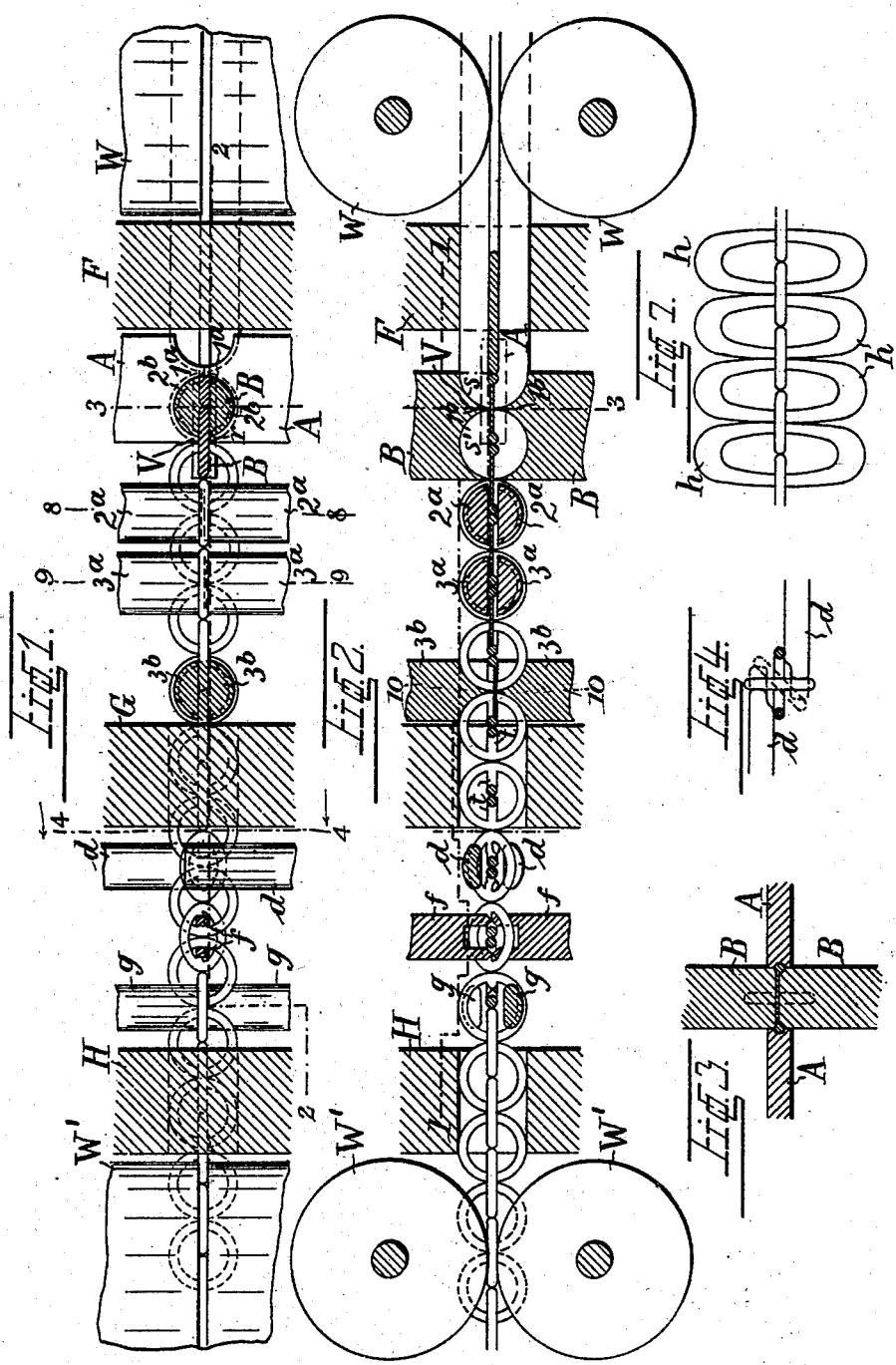

No. 671,037. Patented Apr. 2, 1901.
F. W. WESNER.
METHOD OF MAKING CHAINS FROM CROSS IRON.
(Application filed Mar. 13, 1899.)
(No Model.) 4 Sheets—Sheet 2.

No. 671,037. Patented Apr. 2, 1901.
F. W. WESNER.
METHOD OF MAKING CHAINS FROM CROSS IRON.
(Application filed Mar. 13, 1899.)
(No Model.) 4 Sheets—Sheet 3.

WITNESSES: Fred White, Thomas F. Wallace

INVENTOR: Friedrich Wilhelm Wesner
By his Attorneys

No. 671,037. Patented Apr. 2, 1901.
F. W. WESNER.
METHOD OF MAKING CHAINS FROM CROSS IRON.
(Application filed Mar. 13, 1899.)
(No Model.) 4 Sheets—Sheet 4.
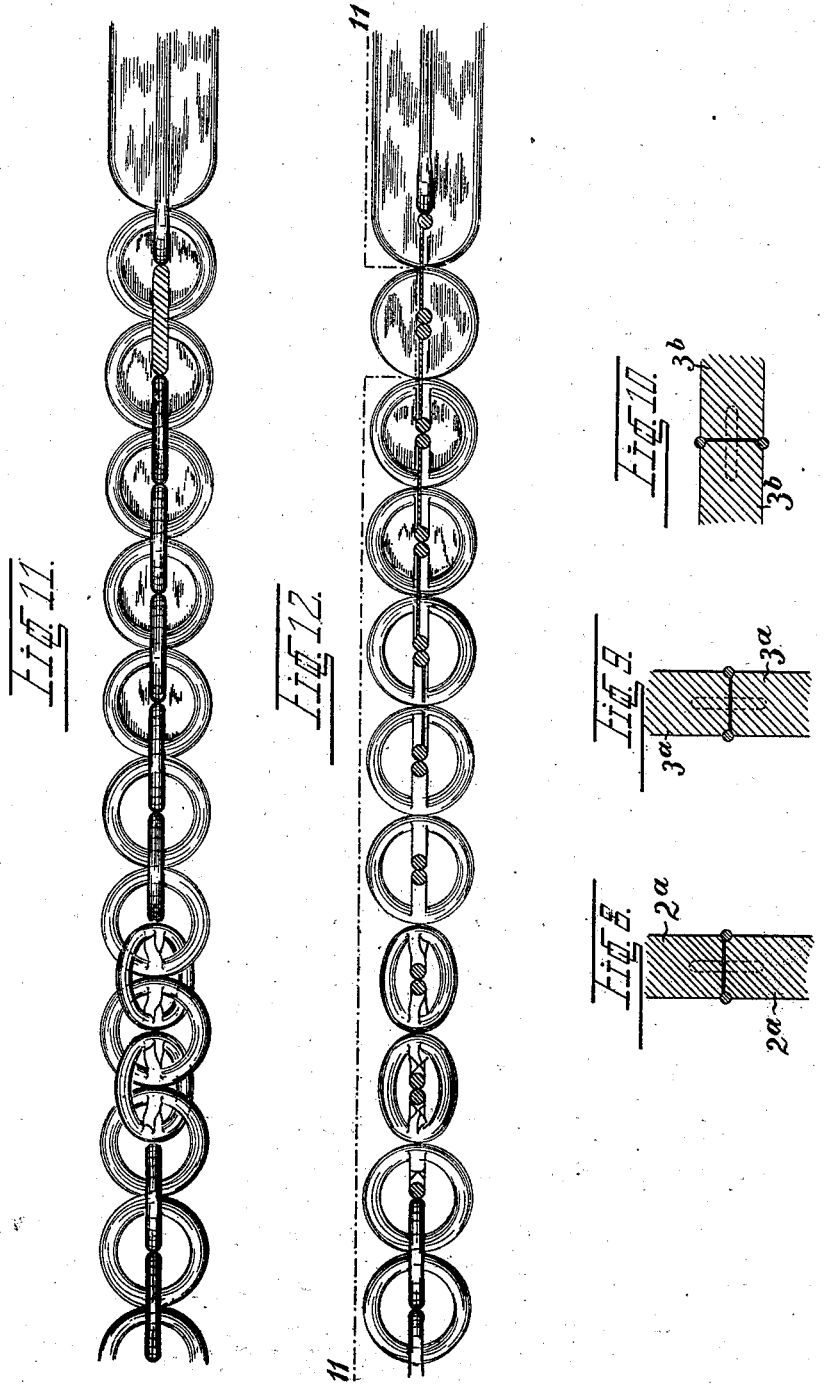

UNITED STATES PATENT OFFICE.

FRIEDRICH WILHELM WESNER, OF CHARLOTTENBURG, GERMANY.

METHOD OF MAKING CHAINS FROM CROSS-IRON.

SPECIFICATION forming part of Letters Patent No. 671,037, dated April 2, 1901.

Application filed March 13, 1899. Serial No. 708,816. (No model.)

*To all whom it may concern:*

Be it known that I, FRIEDRICH WILHELM WESNER, a subject of the German Emperor, residing at Charlottenburg, in the German Empire, have invented a certain new and useful Improved Method of Manufacturing Chains from Cross-Iron; and I do hereby declare the following to be a full, clear, and exact description of the invention, such as will enable others skilled in the art to which it appertains to make and use the same.

This invention relates to the manufacture of chains from cross-iron or steel—that is, from bar-iron or steel bars having the section of a cross.

Attempts have been made before to manufacture complete chains from cross-iron, the links of which were without welding-seams, in various ways, however not with such success that one of the known methods could be practically carried into effect. The deficiencies inherent to these known methods are of various kinds. The apparatus or plants that have been suggested for manufacturing chains of the said kind have been so exceedingly costly and complicated that the manufacture either turned out a failure altogether or the machines had to be repaired so soon and frequently that the production of the chains proved to be more costly than when they are made by hand. Also by certain methods it was not possible to turn the complete cross-iron bar into a chain, so that a large amount of the material had to be cast to the scrap, and, moreover, it was not possible to confine the successive operations to a short distance on the length of the bar, which is absolutely necessary in order to maintain the requisite heat given to the iron or steel a sufficient length of time until it has been completely turned into finished chain-links. It also proved extremely difficult to sever the different links from each other. The deficiencies are not present in my method. The apparatus for carrying the same into effect are exceedingly simple and can be built up with little cost. The operation is carried on on a very small part of the length of the cross-iron bar and during such short space of time that the manufacture of the chain proceeds very quick. There are only very small bits that are thrown into the scrap, and the severing of the links from each other is carried on by my method in the simplest manner, smoothly and without difficulty. The cross-iron bar to be made into a chain is first heated to the necessary degree and then fed intermittingly between four dies reciprocating toward and away from each other at each time for such a length that two links may be formed at each stroke of the dies. When the links have attained the annular or oval shape, a small web of rectangular cross-section remaining integral with and between the links, the severing is brought about by twisting the links against each other, notching the said webs on two opposite sides, and twisting the links back again. Thereupon if the links are below a certain thickness the chain is once more heated and operated upon by such dies that by their action in pressing toward each other the chain attains its final shape, whereby the remaining parts of the webs are pressed into the flesh of the links. When the links are above a certain thickness, it is not necessary to heat the blank a second time for the last-named operation.

In the drawings is shown a machine for carrying my method into effect.

Figures 1 and 2 show diagrammatically the dies in two different longitudinal sections, Fig. 1 being drawn to the line 1 1 of Fig. 2 and Fig. 2 being drawn to the line 2 2 of Fig. 1. Fig. 3 is a cross-section drawn to the line 3 3 of Figs. 1 and 2, and Fig. 4 is a cross-section drawn to the line 4 4 of Figs. 1 and 2. Fig. 5 is a plan, and Fig. 6 an elevation, of a complete machine. Fig. 7 illustrates a modified form of chain. Fig. 8 is a cross-section drawn to the line 8 8, and Fig. 9 is a cross-section drawn to the line 9 9, of Fig. 1. Fig. 10 is a cross-section drawn to the line 10 10 of Fig. 2, and Figs. 11 and 12 are respectively a sectional plan and a sectional elevation of a cross-bar, showing the various steps in the operation of forming a chain thereform, Fig. 11 being taken on the line 11 11 of Fig. 12.

Similar characters refer to similar parts.

While in carrying out my invention I may use any suitable form of mechanism for operating the dies, I prefer to use that described and claimed in an application filed by me on the 13th day of March, 1899, for improvements in forging-machines, Serial No. 708,817, which construction is illustrated and briefly described herein, but for a more detailed description of which I refer to said application.

As has been said above, the cross-iron is first heated in a suitable oven (not shown in the drawings) and fed intermittingly to the dies. This is done by means of two rolls W, in front of which there is a guide-block F, having an opening corresponding to the section of the cross-iron through which the cross-iron is fed along by means of the said rolls. After passing the guide-blocks F the cross-iron is simultaneously operated upon by four dies A and B in such manner that two dies A are moved in horizontal direction and two dies B are moved in vertical direction toward the cross-iron, whereupon all four dies again retire. In the first feeding movement the front end of the cross-iron arrives at the line 1, whereupon the dies A and B approach each other. The section $1^a$ of the horizontal dies A are pressed into the horizontal blades of the cross-iron and produce by their corresponding shape the outer rounding off of one link and the half of the next following link lying in the same plane. This rounding off of one and a half links in the same plane is only produced by the first operation of the dies on a new cross-iron bar. At every following operation after renewed feeding forward of the bar only a V-shaped impression is made by the correspondingly-shaped part V of the die-section $1^a$, while the named half rounding off produced by the preceding operation serves as a guide for the part $r$ of the die-section $1^a$. Together with the die-section $1^a$ also the vertical sections $1^b$ and $2^b$ operate on the cross-iron. The die $2^b$ is round or oval-shaped, according to the desired shape of link to be produced, and is hollowed at its outer edge to the shape of a quarter of a circle. This die-section presses at both sides of the vertical blade of the cross-iron into the horizontal blade, so as to make a semicircular impression into the semicircular solid iron piece rounded off on the outside by the above-named die-section $1^a$, so that the material is pressed from the center to the outer rim, and also the inner rounding off of the link-blank is attained. Between the sections $2^b$ a thin metal layer is left, since it is not possible to squeeze all the metal to a side, and therefore a thin sheet or partition-wall remains, which is punched out later on. It may be gathered from the above that nearly all the metal of the cross-iron blade is made use of to shape the link. Therefore the thickness of the cross-iron must be less than that of the chain to be produced. On the section $2^b$ there are on the under side depressions $s\ s'$ of the shape of a quarter of a circle of a size corresponding to the thickness of the chain to be produced, which depressions are rounded off at the bottom and which meet at the center of the first-formed link and between which the V-shaped section $1^b$ is formed. This section $1^b$ in the operation of the complete die forces its way into the vertical blade of the cross-iron, and thus produces the front and hinder rounding off of two successive links. The dies after having acted in the above-said manner then retire, moving away from each other, and permit a renewed feed of the cross-iron bar for the length of a complete link. After each feed the dies operate in the same manner as above described on the next following part of the bar. After the first feed only the outer rounding off of the first vertical link is completed by means of the depression $s'$ of the die-sections $1^b\ 2^b$. The rounding off which is produced by the depression $s'$ at the first operation of the dies need not be considered, since this round part is finally allowed to go into the scrap, it being merely a half of a link. After the next feeding operation the first vertical link-blank, being now completely rounded off on the outside, arrives between the die-sections $2^a$, which create the semicircular impressions and the inner rounding off. The die-sections $2^a$, like the previously-named sections $2^b$, are so formed that the thin metal plate left between them does not lie exactly in the central plane, but advantageously to one side of such plane and parallel therewith. For this purpose the right-hand die-section $2^a$ is somewhat shorter than the left-hand die-section. The next following operation is accomplished by the die-section $3^a$, which is shaped in the same manner as the die-section $2^a$, with the exception that now the left-hand die-section is the longer one. By these means the metal plate is pushed beyond the central plane, and thus punched off. This being done the first-formed horizontal link arrives at the next following operation between the vertical die-sections $3^b$, which only differ from the sections $2^b$ inasmuch as the upper sections are somewhat longer. While speaking of the sections $2^b$, the under section is longer than the upper one. By these means also the metal plate formed in the horizontal link-blanks are punched out. After passing the die-sections $3^b$ the links only adhere by the webs $t$, upon which the above-described vertical and horizontal die-section can have no effect, thus being unable to get at them. These webs are cut or broken at their center by twisting the links against each other in one direction, making notches into the webs, and twisting the links back again, as hereinafter described. In order to give the links the necessary support while performing this operation, fixed guide-blocks G and H are mounted in front of the sections $3^b$, which guide-blocks are arranged for a distance apart from one another equal to the length of three links. When the first vertical link has passed the guide-block G, the horizontal die-section $d$ gives the same a twist or a partial rotation about its longitudinal center line, the upper section $d$ pushing the upper part of the link to one side and the other section $d$ pushing the lower part of the link to the other side.

Figure 6:
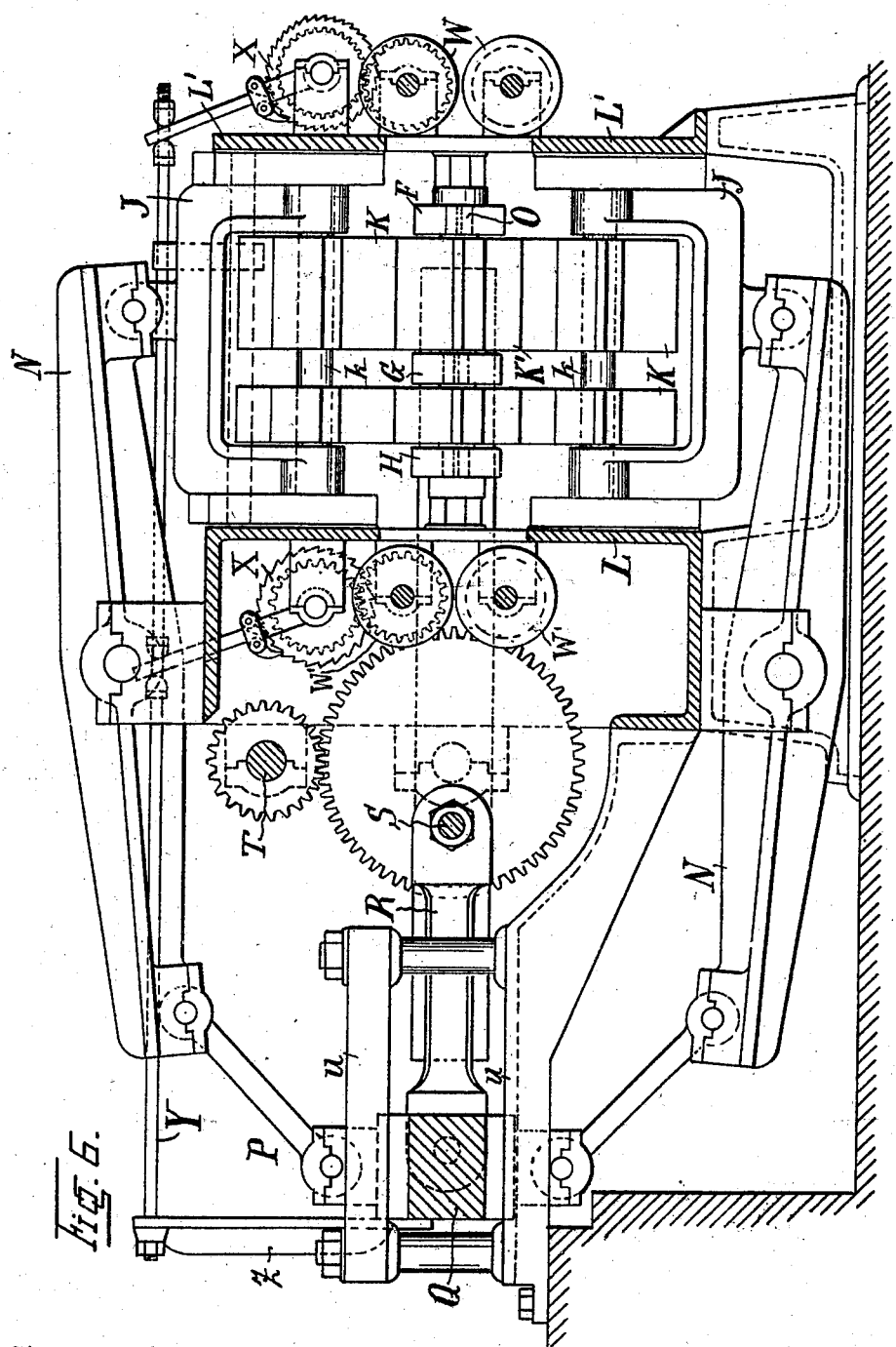

This enables the vertical movable blunt cutters or nippers $f$ to act upon the webs $t$ after the next feed being carried on, whereby a sharp indentation or notch is made into the wed $t$ from two opposite sides. The sections $g$ are shaped similar to the sections $d$. However, they are somewhat shorter and arranged inversely as to the height. By these sections $g$ the link is twisted into its normal position, whereby it is severed from the two neighboring links. In front of the guide-block H another pair of feed or drawing rolls W' are mounted, which serve to carry on the chain. Should the severing not be fully accomplished by the described means when the iron or steel is particularly tough, special means may be designed to complete such severing—as, for instance, an impact device arranged in front of the guide-block H for pushing the links as they project from the guide-block successively to one side, and thus breaking them off. When leaving the rolls W', the chain may be drawn through another oven, (not shown in the drawings, since any suitable oven may be employed,) so as to again be heated to red heat. This reheating, however, will not be necessary for thick chains. The chain must leave the second oven in vertical position, and it enters between other dies, which are arranged so as to act upon the chains from four sides instead of from two sides and from above and from below—that is to say, a machine, as shown in Figs. 5 and 6, is used vertically instead of horizontally, as shown. By a machine thus arranged the remaining parts of the webs $t$ are battered or pressed down into the flesh of the links, which also attain their final shape.

If it is desired to make chains having long oval links, the breadth of the cross-iron is advantageously chosen so as to produce by dies similar to those shown in Figs. 1 and 2 oval links the long side of which is at right angles to the center line of the bar. Thereby the advantage is attained that after passing the feed-rolls W or the second oven, if such a one is employed, the links by means of their own weight are turned so as to hang down longitudinally, thus allowing the remaining parts of the webs to be situated at the center between the ends of the neighboring links. When the links are annular, the remaining parts of the webs also slide against one another, owing to their wedge-like shape, so that they are side by side. However, it may happen that at the place where the second vertically-arranged machine, Figs. 5 and 6, has operated upon them, the inner rounding off is not so highly finished. The links are annular at the first stages of operation only in such case when the links of the finished chain are short—that is to say, when the length of the same does not surpass three times the thickness of the iron. The above-described method also has the advantage that those parts of the link which bear against the neighboring links can be made thicker than the rest of the link, thus allowing greatly for wear without losing its strength and securing a longer life of the chain than if the links have the same thickness throughout. In the first stages of operation the said thick parts are situated at the outer edges, Fig. 7.

The dies A and B after every contact with the red-hot iron are cooled by dipping into or sprinkling with water or moistened by means of wet cloths. The shafts $k$, on which the die-carriers are mounted, are journaled in yokes J, which are suitably guided on standards L L'. The yokes J are pivoted to the ends of levers N, which near their center are fulcrumed to the framing of the machine, and with their other ends are connected, by means of links P, to cross-head Q, guided between four horizontal guides $u$. The cross-head Q is reciprocated by means of a crank-shaft S, connected to the cross-head Q by a rod R and driven by a suitable gearing rotated from the driving-shaft T. The latter may be provided with a fly-wheel and carries a pulley U, driven by a belt or otherwise from any supply of force. The rotation of the crank-shaft produces a reciprocating motion of the cross-head, which sets the four levers N to oscillate about their fulcrums, thus forcing the die-carriers K and K' toward and away from each other. When the dies retract from one another, the cross-iron bar or the newly-formed chain is fed forward. For this purpose the rolls W and W' are provided with ratchet mechanisms X, which are operated by the push-rod Y. This push-rod is guided in a suitable manner on the framing and is attached to the cross-head Q by an arm Z.

The described mechanism for operating the cross-head is especially adapted when chains of minor thickness are to be made. In machines in which heavy chains are to be manufactured the cross-head may be attached directly to the piston-rod of a steam-engine.

As has been said before, the machine for operating on the chain after it has passed the second oven is built in the same manner as described with reference to Figs. 5 and 6, with the difference that the dies move in horizontal planes instead of in a vertical plane and the cross-head moves in a vertical direction instead of in a horizontal direction—that is to say, it is the same machine arranged vertically—of course the dies being shaped according to the work to be performed.

Each die-carrier may be arranged in both machines with a more or less number of dies instead of with four, as shown.

Having now particularly described my invention, what I claim, and desire to secure by Letters Patent, is—

1. The method of manufacturing a chain from a cross-metal bar, which consists in first pressing said bar upon four sides simultaneously to form a link-blank having a thin interior web, then punching out such web, then tilting the successive links so as to twist the intervening attaching portions, and then cutting said attaching portions to enable the links to be severed.

2. The method of manufacturing a chain from a cross-metal bar, which consists in first pressing said bar upon four sides simultaneously to form a link-blank having a thin interior web, then punching out such web, then tilting the successive links so as to twist the intervening attaching portions, then notching such attaching portions, and then tilting the successive links so as to break apart said notched attaching portions.

3. The method of manufacturing chains, which consists in forming a weldless chain from a bar with the links arranged at substantially right angles to the positions they are to occupy in use, and after the links are severed from each other turning them to the positions they are to occupy in use, whereby the severed portions are rendered accessible for finishing.

4. The method of manufacturing chains composed of oblong links, which consists in forming a weldless chain from a bar with the links arranged at substantially right angles to the positions they are to occupy in use, the ends of the links being formed of thicker metal than the sides, and then turning said links to the positions they are to occupy in use.

In testimony whereof I affix my signature in presence of two witnesses.

FRIEDRICH WILHELM WESNER.

Witnesses:
MAX C. STAEBLER,
WOLDEMAR HAUPT.